US010713216B2

(12) United States Patent
Roy

(10) Patent No.: US 10,713,216 B2
(45) Date of Patent: Jul. 14, 2020

(54) USING RELATIVE GENERATION NUMBERS TO DEDUPLICATE FILE SYSTEM EVENTS

(71) Applicant: EMC IP Holding Company LLC, Hopkinton, MA (US)

(72) Inventor: Dipankar Roy, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 346 days.

(21) Appl. No.: 15/884,839

(22) Filed: Jan. 31, 2018

(65) Prior Publication Data

US 2019/0236161 A1 Aug. 1, 2019

(51) Int. Cl.
*G06F 16/13* (2019.01)
*G06F 16/174* (2019.01)
*G06F 3/06* (2006.01)
*G06F 9/54* (2006.01)
*G06F 16/17* (2019.01)

(52) U.S. Cl.
CPC .......... *G06F 16/137* (2019.01); *G06F 3/0641* (2013.01); *G06F 16/1734* (2019.01); *G06F 16/1748* (2019.01); *G06F 9/544* (2013.01)

(58) Field of Classification Search
CPC .. G06F 16/137; G06F 16/1748; G06F 16/182; G06F 9/544; G06F 3/0641; G06F 3/0608; G06F 3/067; G06F 16/1734
See application file for complete search history.

(56) References Cited

U.S. PATENT DOCUMENTS

| | | | | |
|---|---|---|---|---|
| 5,996,054 | A * | 11/1999 | Ledain | G06F 16/1734 711/203 |
| 9,043,430 | B2 * | 5/2015 | Condict | G06F 3/0641 709/214 |
| 9,501,545 | B2 * | 11/2016 | Woodward | G06F 11/1461 |
| 10,042,719 | B1 * | 8/2018 | Chopra | G06F 11/1466 |
| 2019/0235778 | A1 * | 8/2019 | Jin | G06F 3/0608 |

* cited by examiner

*Primary Examiner* — Jorge A Casanova
(74) *Attorney, Agent, or Firm* — Krishnendu Gupta

(57) ABSTRACT

Implementations are provided herein for using relative generation numbers for deduplicating kernel events modification events. The process can identify multiple modification events that take place on the same inode within a configurable relative amount of time and deduplicate the events against one another. A hash table can be used to store a global list of events associated with inodes, and thus only the hash table need be deduplicated. Filter buffer(s) setup when an Server Message Block ("SMB") client requests a change notifications on a file and/or directory can then use the data from the hash table(s) to notify clients of change notify events.

18 Claims, 9 Drawing Sheets

| HASH TABLE – GENERATION # 15 | | | |
|---|---|---|---|
| EVENT LIN | PARENT LIN | EVENT TYPE | GENERATION # |
| 0025 | 002 | WRITE | 15 |
| 0035 | 002 | SIZE CHANGE | 10 |
| 0060 | 0040 | WRITE | 14 |
| 0071 | 0053 | WRITE | 15 |
| 0114 | 0326 | WRITE | 6 |

| EVENT ENTRIES RECEIVED FROM KERNEL BUFFER | | | |
|---|---|---|---|
| EVENT LIN | PARENT LIN | EVENT TYPE | GENERATION # |
| 0025 | 002 | WRITE | |
| 003 | 002 | WRITE | |
| 0060 | 0040 | DELETE | |
| 0063 | 0040 | WRITE | |
| 0071 | 0053 | WRITE | |
| 0114 | 0326 | WRITE | |

| HASH TABLE – GENERATION # 16 | | | |
|---|---|---|---|
| EVENT LIN | PARENT LIN | EVENT TYPE | GENERATION # |
| 0025 | 002 | WRITE | 16 |
| 0035 | 002 | SIZE CHANGE | 10 |
| ~~0060~~ | ~~0040~~ | ~~WRITE~~ | ~~14~~ |
| 0071 | 0053 | WRITE | 16 |
| 0114 | 0326 | WRITE | 16 |
| 003 | 002 | WRITE | 16 |
| 0063 | 0326 | WRITE | 16 |

```
┌─────────────────────────────────────────────────────────────────────────┐
│ RECEIVING A SET OF CHANGE NOTIFY REQUESTS RECEIVED FROM A SET OF CLIENTS,│
│   WHEREIN CHANGE NOTIFY REQUESTS ARE ASSOCIATED WITH AT LEAST ONE        │
│             TARGET FILE OR TARGET DIRECTORY                          302 │
└─────────────────────────────────────────────────────────────────────────┘
                                    │
                                    ▼
┌─────────────────────────────────────────────────────────────────────────┐
│ GENERATING A SET OF USER SPACE FILTER BUFFERS, WHEREIN USER SPACE FILTER │
│      BUFFERS ARE ASSOCIATED WITH CHANGE NOTIFY REQUESTS            304  │
└─────────────────────────────────────────────────────────────────────────┘
                                    │
                                    ▼
┌─────────────────────────────────────────────────────────────────────────┐
│    GENERATING A HASH TABLE TO STORE EVENT ENTRIES WHEREIN EACH EVENT    │
│ ENTRY INCLUDES AT LEAST AN EVENT LOGICAL INODE NUMBER ("LIN"), A PARENT │
│        LIN, AN EVENT TYPE, AND A GENERATION NUMBER              306    │
└─────────────────────────────────────────────────────────────────────────┘
                                    │
                                    ▼
┌─────────────────────────────────────────────────────────────────────────┐
│ MAINTAINING A HASH TABLE GENERATION NUMBER ASSOCIATED THE HASH TABLE    │
│                                                                    308  │
└─────────────────────────────────────────────────────────────────────────┘
```

```
IN RESPONSE TO THE EVENT LIN OF THE EVENT ENTRY IN THE NEW SET OF EVENT
ENTRIES NOT MATCHING THE EVENT LIN OF AN EVENT ENTRY IN THE HASH TABLE
                                                                    610

ADDING THE EVENT ENTRY TO THE HASH TABLE
                                                              612

ADDING THE EVENT ENTRY TO A SUBSET OF USER SPACE FILTERS ASSOCIATED
                           WITH THE EVENT LIN
                                                                    614

NOTIFYING CLIENTS ASSOCIATED WITH THE SUBSET OF USER SPACE FILTER
                               BUFFERS
                                                                    616
```

RECEIVING A SET OF CHANGE NOTIFY REQUESTS RECEIVED FROM A SET OF CLIENTS, WHEREIN CHANGE NOTIFY REQUESTS ARE ASSOCIATED WITH AT LEAST ONE TARGET FILE OR TARGET DIRECTORY  702

GENERATING A SET OF USER SPACE FILTER BUFFERS, WHEREIN USER SPACE FILTER BUFFERS ARE ASSOCIATED WITH CHANGE NOTIFY REQUESTS  704

GENERATING A HASH TABLE TO STORE EVENT ENTRIES WHEREIN EACH EVENT ENTRY INCLUDES AT LEAST AN EVENT LOGICAL INODE NUMBER ("LIN"), A PARENT LIN, AN EVENT TYPE, AND A GENERATION NUMBER  706

MAINTAINING A HASH TABLE GENERATION NUMBER ASSOCIATED THE HASH TABLE  708

DETERMINING A VALUE DIFFERENCE BETWEEN THE GENERATION NUMBER OF EVENT ENTRIES OF THE HASH TABLE AND THE GENERATION NUMBER ASSOCIATED WITH THE HASH TABLE FOR EACH EVENT ENTRY IN THE HASH TABLE  710

IN RESPONSE TO THE VALUE DIFFERENCE BEING GREATER THAN A FREQUENCY THRESHOLD FOR AN EVENT ENTRY IN THE HASH TABLE, DELETING THE EVENT ENTRY FROM THE HASH TABLE  712

FIG. 7

USING RELATIVE GENERATION NUMBERS TO DEDUPLICATE FILE SYSTEM EVENTS

FIELD OF THE INVENTION

This invention relates generally to processing data, and more particularly to systems and methods for deduplicating file system modification events.

BACKGROUND OF THE INVENTION

Distributed file systems offer many compelling advantages in establishing high performance computing environments. One example is the ability to easily expand, even at large scale. An example distributed file system is one that is distributed across multiple nodes in a cluster of nodes. An individual node can encompass a set of storage drives capable of storing data accessible by clients of the clusters of nodes. Distributed file system can support connections from clients using multiple different network protocols. One example protocol is Server Message Block ("SMB"). The SMB protocol provides for clients to subscribe for change notify events, whereby the client can request that any changes to a file and/or directory provide a notification to the client from the server.

In large scale distributed file systems, scaling to hundreds of nodes, many different clients can be connected to the distributed file system performing tasks that can trigger change notify events under the SMB protocol. In addition, for some events, for example a write, a single large write can get split into multiple chunks of smaller writers when processed by the file system kernel. In many file systems, an inode exists for a file that maps the chunks of data that together comprise the entirety of the file. Thus, when a large write occurs, multiple chunks may get written to accomplish the write if the write size far exceeds the file system chunk size. Each kernel write targeted to individual chunks of data can trigger SMB change notify events for a single write event to a file. In the event the kernel generates a large number of events in short periods of times, these change notify requests can overflow buffers designed to process them, often flooding the buffer with multiple chunk writes for a single write event. Processing these redundant events and passing them to a client that is registered to the change notify event can cause waste storage, compute and network resources and could lead to process failure in some examples. Thus, there exists a need to limit the number of change notifications that are processed and/or sent to a client.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a set of change notify requests can be received from a set of clients, wherein change notify requests are associated with at least one target file or target directory. A set of user space filter buffers can be generated, wherein user space filter buffers are associated with change notify requests. A hash table can be generated to store event entries where each event entry includes at least an event logical inode number ("LIN"), a parent LIN, an event type, and a generation number. A hash table generation number associated with the hash table can be maintained.

In accordance with another aspect, a new set of event entries can be received form a kernel space buffer. In response to receiving the new set of event entries, the hash table generation number associated with the hash table can be incremented and the incremented hash table generation number can be assigned as the generation number for each event entry in the new set of event entries. It can be determined whether the event LIN of an event entry in the new set of event entries matches the event LIN of an event entry in the hash table.

In accordance with another aspect, in response to the event LIN of the event entry in the new set of event entries not matching the event LIN of an event entry in the hash table, the event entry can be added to the hash table, the event entry can be added to a subset of user space filters associated with the event LIN, and clients associated with the subset of user space filter buffers can be notified.

In accordance with another aspect, in response to the event LIN of the event entry in the new set of event entries matching the event LIN of an event entry in the hash table, a value difference between the generation number of the event entry in the new set of event entries and the generation number of the event entry in the hash table can be determined. In response to the value difference being less than a frequency threshold, the event entry can be deduplicated.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 2 illustrates example hash tables and event entries in accordance with implementations of this disclosure;

FIG. 3 illustrates an example flow diagram method for establishing a hash table and filter buffers for deduplicating file system events in accordance with implementations of this disclosure;

FIG. 6 illustrates an example flow diagram method for introducing a new event entry into a hash table in accordance with implementations of this disclosure;

FIG. 7 illustrates an example flow diagram method for deleting event entries from a hash table in accordance with implementations of this disclosure;

DETAILED DESCRIPTION

Figure 1:
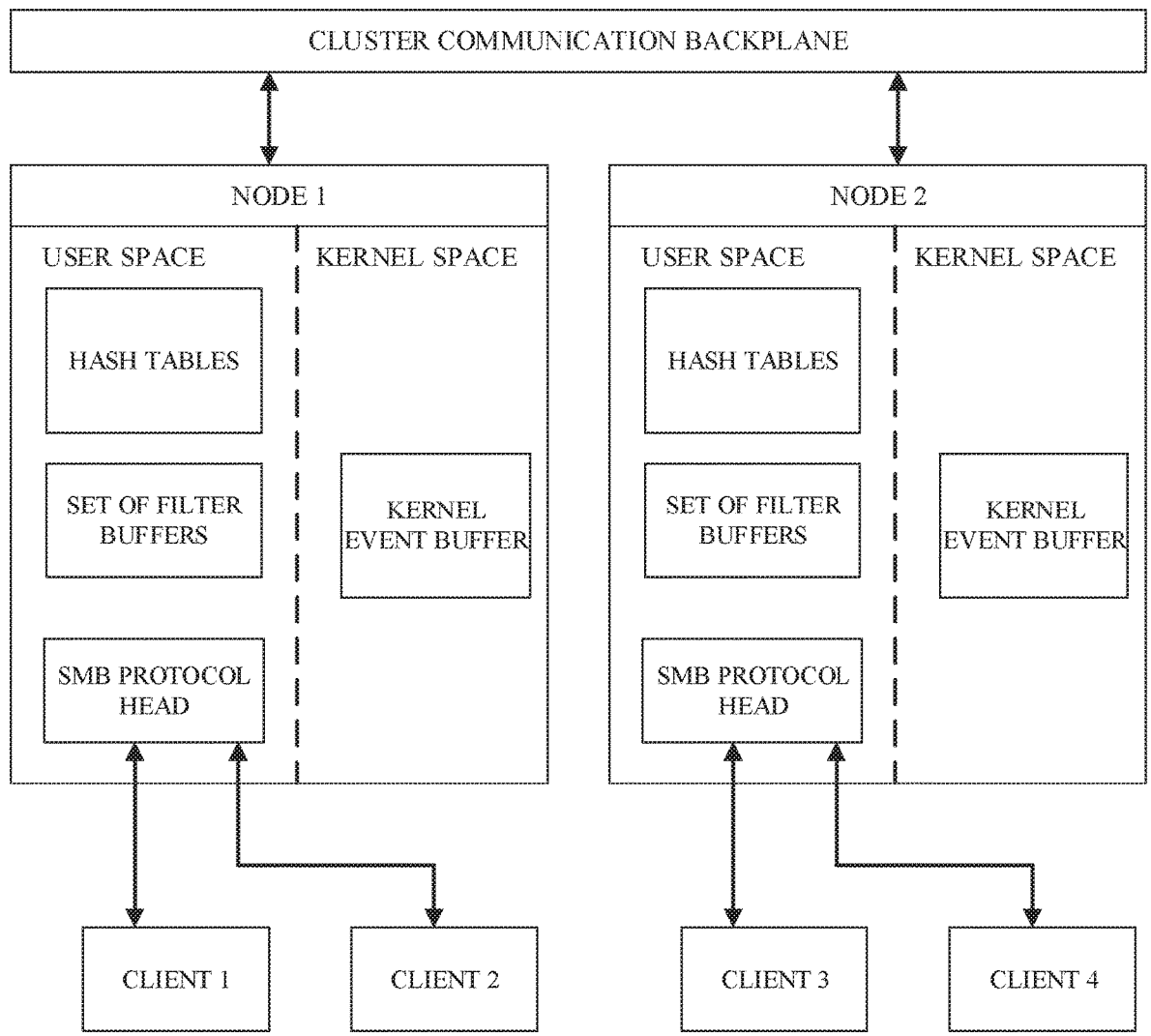
FIG. 1 illustrates an example cluster of nodes where nodes including clients and data structures in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode number ("LIN") mappings that reference unique inodes that contain the physical location(s) of the data stored within the file system. For example, processes can use unique LIN's to reference the associated inode that can contain a data tree that maps the logical block numbers to the actual physical location(s) of the block file data for a file within the file system. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "inode" as used herein refers to in-memory representation of on-disk data structures that may store information, or meta-data, about files and directories, such as file size, file ownership, access mode (read, write, execute permissions), time and date of creation and modification, file types, data protection process information such as encryption and/or compression information, snapshot information, hash values associated with location of the file, mappings to cloud data objects, pointers to a cloud metadata objects, etc. In one implementation, inodes may be in a known location in a file system, for example, residing in cache memory for fast and/or efficient access by the file system. In accordance with implementations disclosed herein, separate inodes can exist for the same file, one inode associated with the cache overlay layer and a second inode associated with the storage layer.

In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

Implementations are provided herein for using relative generation numbers for deduplicating kernel events modification events. The process can identify multiple modification events that take place on the same inode within a configurable relative amount of time and deduplicate the events against one another. A hash table can be used to store a global list of events associated with inodes, and thus only the hash table need be deduplicated. Filter buffer(s) setup when an SMB client requests a change notifications on a file and/or directory can then use the data from the hash table(s) to notify clients of change notify events.

It can be appreciated that by using relative generation numbers, timestamps are not required as recording and sorting timestamps can consume too many resources.

FIG. 1 illustrates an example cluster of nodes where nodes including clients and data structures in accordance with implementations of this disclosure. Change notify requests can be submitted by Clients 1-4 and can be received by an SMB Protocol head residing in node of the distributed file system. A filter buffer can then be created in user space that receives change notify events and then in conjunction with the protocol head sends the notification(s) back to the client. Each filter buffer setup can be associated with a hash table Thus, in some implementations, a separate hash table is create per filter buffer (e.g., per change notification request received by a client). As the kernel event buffer fills up with events as processed by kernel operations in the file system, it will eventually dump its contents into user space for ingestion in user space hash tables. Each time the kernel event buffer is flushed, a generation number associated with the hash table itself can be incremented, and each event entry that is flushed can be assigned the newly incremented generation number. By comparing the generation number of an event entry in the hash table with the current generation number of the hash table and its new entries, some events may be ripe for deduplication.

FIG. 2 illustrates example hash tables and event entries in accordance with implementations of this disclosure. The examples first list a hash table with a generation number of 15 and it includes 5 event entries. It can be appreciated that this is an example only and the actual size of the hash table can include more or less LIN's than depicted.

Event entries in the hash table include an event LIN, a parent LIN to the event LIN, an event type, and a generation number. It can be appreciated that the event LIN is the LIN that is being directly affected by the event type. In the first entry in the hash table with a generation number of 15, event LIN 0025 with a parent LIN of 002 has undergone a write that is associated with the generation number 15. This indicates that this entry was new to the hash table as of the current generation of the hash table, 15. Event type can include writes, size changes, deletes, or conceivably any file operation that the change notify aspect of a protocol supports.

The middle table depicts a set of new event entries received from the kernel buffer from the most recent flush.

When the entries are first received, the entries are missing a generation number as the kernel is not aware of this post processing that is occurring in user space at the file system driver layer. The hash table's generation number of 15 can be incremented by 1 to 16, and all new event entries received in the kernel buffer flush can be assigned a generation number of 16, It can be appreciated that the generation number of the hash table keeps track of relative time to deduplicate events. The number is initialized when the hash table is created. The system time at hash table initialization can also be stored in the filter buffer that first created. The generation number of the hash table is updated after reading events from the kernel buffer and prior to sending any necessary notification events to the filter buffer in response to any relevant new events from the kernel buffer flush. Thus the generation number of the hash table is updated according to the rate at which the kernel buffer is flushed.

When adding the events in the middle table, e.g., the events from the most recent kernel buffer flush, a comparison is made to determine any entries that share a common LIN with an entry already in the hash table. If the event does not share a common LIN with an entry in the hash table, a new event entry is created and inserted in the hash table, it is associated with the newly incremented generation number of the hash table, and the event is passed on to the filter buffer for notification to the client. If the event does share a common LIN with an entry in the hash table, the difference between the hash table's generation number and the existing event entry's generation number in the hash table are compared. A frequency threshold that is customizable can be established that provides for how many generation numbers can iterate before events are not deduplicated. For example, if the frequency threshold is 7, then the newly received write associated with LIN 0114 is associated with a hash table generation number of 16 and the previous entry in the hash table has a generation number of 6. Thus, the difference of 10 is greater than the frequency threshold of 7. In this case, the existing event in the hash table is updated to the hash table generation number of 16, and event gets added to the filter buffer to process for notification to the client. Continuing the example of a frequency threshold of 7, LIN 0071 has an existing hash table even entry with a generation number of 15 and the event entry with a generation number of 16 produces a difference of 1. 1 being less than the frequency threshold of 7 means that the new entry is deduplicated and not added to the hash table, while the current entry with the even LIN of 0071 and a generation #15 remains.

One implementation, a hash table can be purged to reduce unnecessary entries by removing any entry in the hash table that has a generation number that is lower than the current generation number of the hash table minus the frequency threshold.

It can be appreciated that in increasing the frequency threshold, more event will likely be deduplicated, given a constant rate of event generation, e.g., normal file system activity.

It can be appreciated that events can happen on any node of the cluster, and new events that are processed on disparate nodes can have their filter buffer contents routed to the node that initially registered the change notify request for a client. It can be appreciated that the node that registers the change notify request is also the owner of the filter buffer.

FIGS. 3-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Referring now to FIG. 3, there is illustrated an example flow diagram method for establishing a hash table and filter buffers for deduplicating file system events in accordance with implementations of this disclosure. At 302, a set of change notify requests can be received from a set of clients, wherein change notify requests are associated with at least one target file or target directory. At 304, a set of user space filter buffers can be generated, wherein user space filter buffers are associated with change notify requests. At 306, a hash table can be generated to store event entries where each event entry includes at least an event LIN, a parent LIN, an event type, and a generation number. At 308, a hash table generation number associated with the hash table can be maintained.

Figure 4:
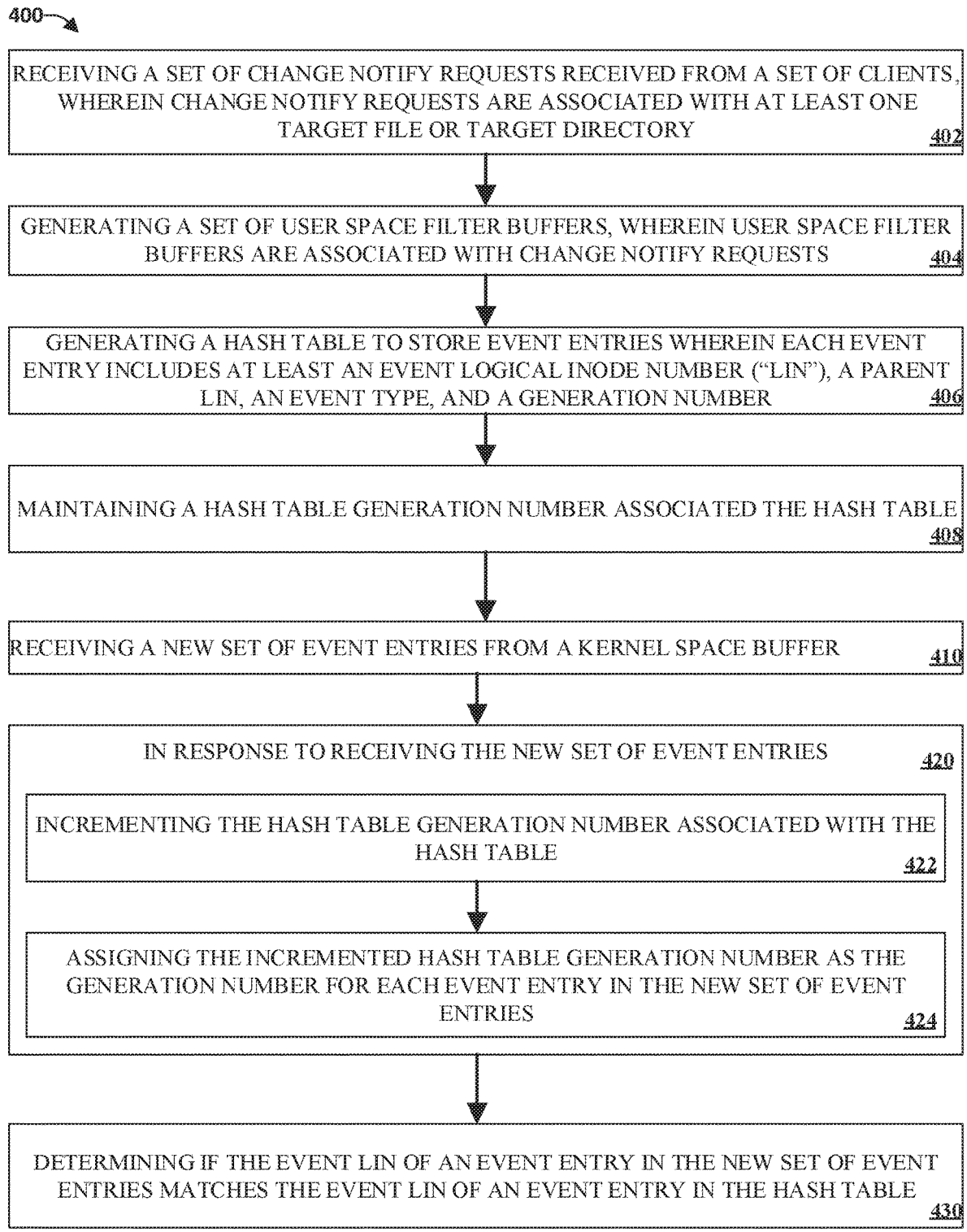
FIG. 4 illustrates an example flow diagram method for receiving new events from a kernel buffer in accordance with implementations of this disclosure.

Referring now to FIG. 4, there is illustrated an example flow diagram method for receiving new events from a kernel buffer in accordance with implementations of this disclosure. At 402, a set of change notify requests can be received from a set of clients, wherein change notify requests are associated with at least one target file or target directory. At 404, a set of user space filter buffers can be generated, wherein user space filter buffers are associated with change notify requests. At 406, a hash table can be generated to store event entries where each event entry includes at least an event LIN, a parent LIN, an event type, and a generation number. At 408, a hash table generation number associated with the hash table can be maintained.

At 410, a new set of event entries can be received form a kernel space buffer. At 420, in response to receiving the new set of event entries steps 422-424 can occur. At 422, the hash table generation number associated with the hash table can be incremented. At 424, the incremented hash table generation number can be assigned as the generation number for each event entry in the new set of event entries. At 430, it can be determined whether the event LIN of an event entry in the new set of event entries matches the event LIN of an event entry in the hash table.

Figure 5:
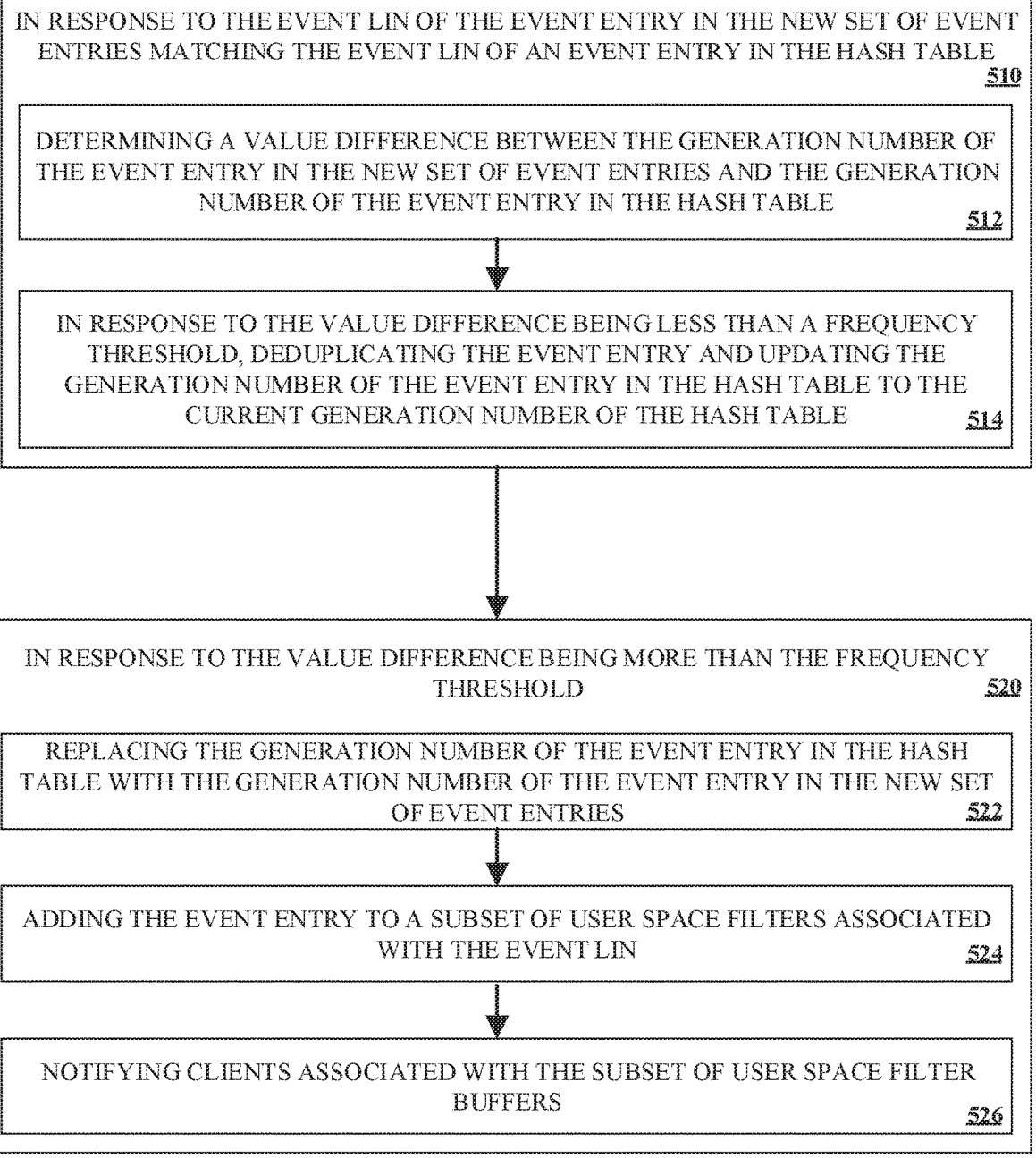
FIG. 5 illustrates an example flow diagram method for processing new event entries into a hash table in accordance with implementations of this disclosure.

Referring now to FIG. 5, there is illustrated an example flow diagram method for processing new event entries into a hash table in accordance with implementations of this disclosure. At 510, in response to the event LIN of the event entry in the new set of event entries matching the event LIN of an event entry in the hash table, steps 512-514 can occur. At 512, a value difference between the generation number of the event entry in the new set of event entries and the generation number of the event entry in the hash table can be determined. At 514, in response to the value difference being less than a frequency threshold, the event entry can be deduplicated.

At 520, in response to the value threshold being more than the frequency threshold, steps 522-526 can occur. At 522, the generation number of the event entry in the hash table can be replaced with the generation number of the event entry in the new set of event entries. At 524, the event entry can be added to a subset of user space filters associated with the event LIN. At 526, clients associated with the subset of user space filter buffers can be notified.

Referring now to FIG. 6, there is illustrated an example flow diagram method for introducing a new event entry into a hash table in accordance with implementations of this disclosure. At 610, in response to the event LIN of the event entry in the new set of event entries not matching the event LIN of an event entry in the hash table, step 612-616 can occur. At 612, the event entry can be added to the hash table. At 614, the event entry can be added to a subset of user space filters associated with the event LIN. At 616, clients associated with the subset of user space filter buffers can be notified.

Referring now to FIG. 7, there is illustrated illustrates an example flow diagram method for deleting event entries from a hash table in accordance with implementations of this disclosure. At 702, a set of change notify requests can be received from a set of clients, wherein change notify requests are associated with at least one target file or target directory. At 704, a set of user space filter buffers can be generated, wherein user space filter buffers are associated with change notify requests. At 706, a hash table can be generated to store event entries where each event entry includes at least an event LIN, a parent LIN, an event type, and a generation number. At 708, a hash table generation number associated with the hash table can be maintained.

At 710, a value difference between the generation number of event entries of the hash table and the generation number associated with the hash table can be determined for each entry in the hash table. At 712, in response to the value difference being greater than a frequency threshold for an event entry in the hash table, the event entry from the hash table can be deleted.

Figure 8:
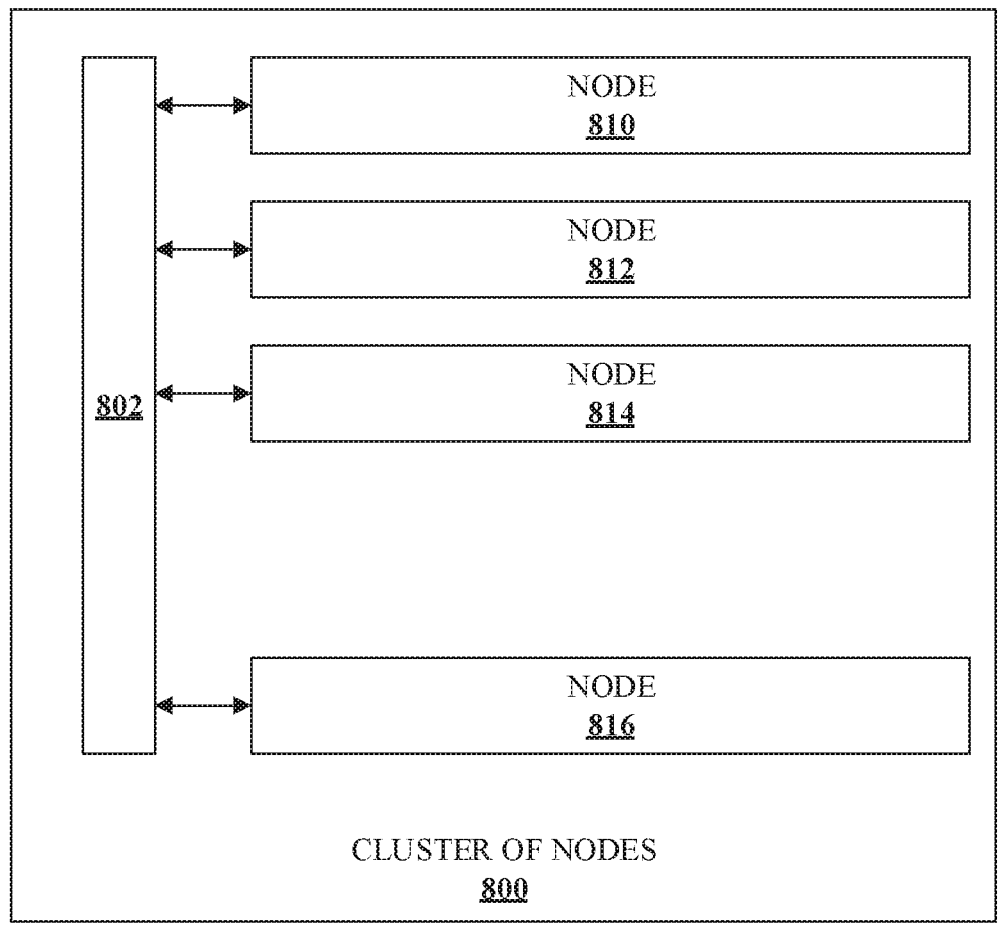
FIG. 8 illustrates an example block diagram of a cluster of nodes in accordance with implementations of this disclosure.

FIG. 8 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 800 as depicted shows Nodes 810, 812, 814 and 816 operating in a cluster; however, it can be appreciated that more or less nodes can make up a cluster. It can be further appreciated that nodes among the cluster of nodes do not have to be in a same enclosure as shown for ease of explanation in FIG. 8, and be geographically disparate. Backplane 802 can be any type of commercially available networking infrastructure that allows nodes among the cluster of nodes to communicate amongst each other in as close to real time as the networking infrastructure allows. It can be appreciated that the backplane 802 can also have a separate power supply, logic, I/O, etc. as necessary to support communication amongst nodes of the cluster of nodes.

It can be appreciated that the Cluster of Nodes 800 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 9:
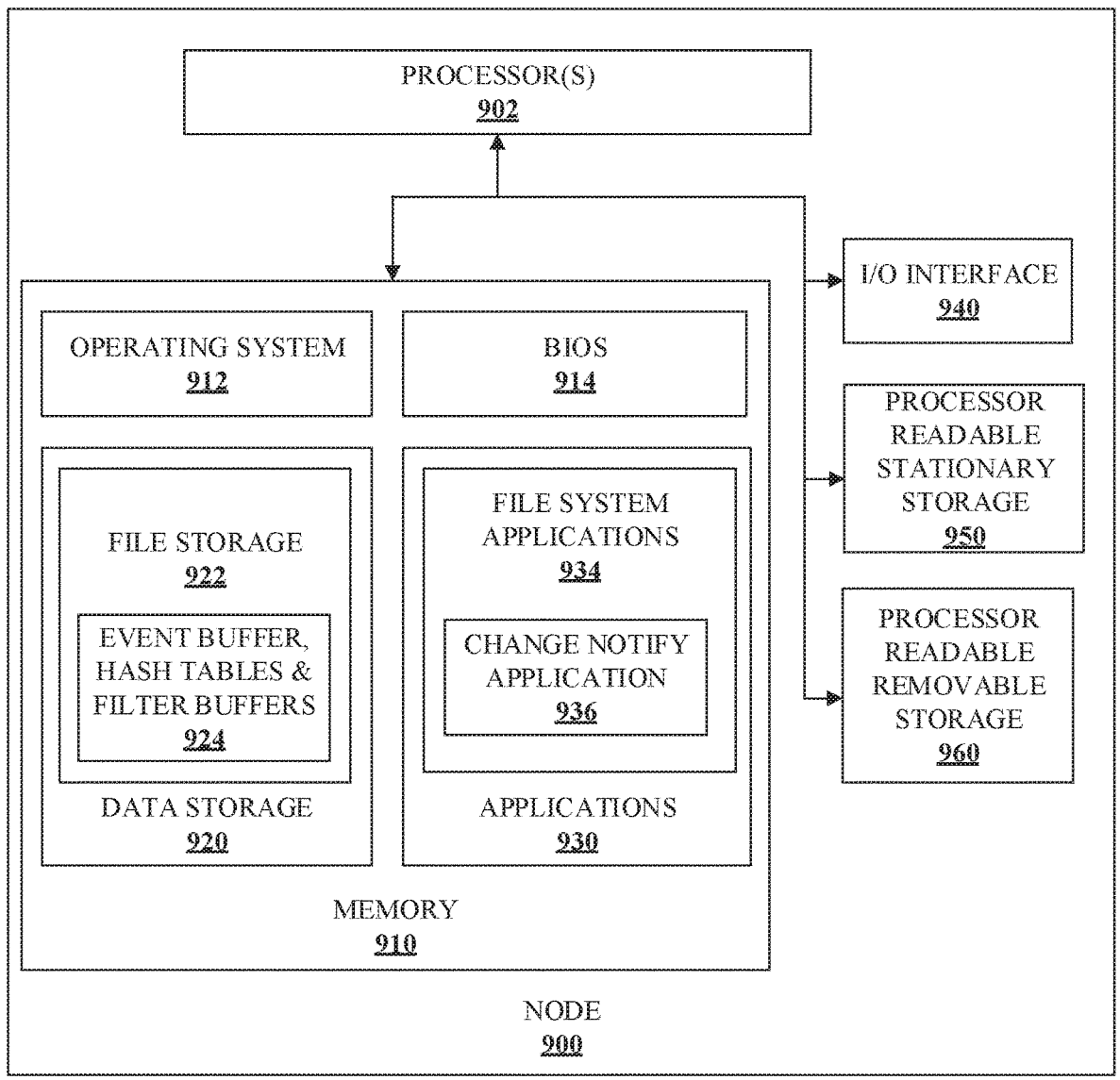
FIG. 9 illustrates an example block diagram of a node in accordance with implementations of this disclosure.

FIG. 9 illustrates an example block diagram of a node 900 in accordance with implementations of this disclosure.

Node 900 includes processor 902 which communicates with memory 910 via a bus. Node 900 also includes input/output interface 940, processor-readable stationary storage device(s) 950, and processor-readable removable storage device(s) 960. Input/output interface 940 can enable node 900 to communicate with other nodes, mobile devices, network devices, and the like. Processor-readable stationary storage device 950 may include one or more devices such as an electromagnetic storage device (hard disk), solid state hard disk (SSD), hybrid of both an SSD and a hard disk, and the like. In some configurations, a node may include many storage devices. Also, processor-readable removable storage device 960 enables processor 902 to read non-transitive storage media for storing and accessing processor-readable instructions, modules, data structures, and other forms of data. The non-transitive storage media may include Flash drives, tape media, floppy media, disc media, and the like.

Memory 910 may include Random Access Memory (RAM), Read-Only Memory (ROM), hybrid of RAM and ROM, and the like. As shown, memory 910 includes operating system 912 and basic input/output system (BIOS) 914 for enabling the operation of node 900. In various embodiments, a general-purpose operating system may be employed such as a version of UNIX, LINUX™, a specialized server operating system such as Microsoft's Windows Server™ and Apple Computer's IoS Server™, or the like.

Applications 930 may include processor executable instructions which, when executed by node 900, transmit, receive, and/or otherwise process messages, audio, video, and enable communication with other networked computing devices. Examples of application programs include database servers, file servers, calendars, transcoders, and so forth. Applications 930 may include, for example, File System Application 934 that can include change notify application 936 and associated logic according to implementations of this disclosure. It can be appreciated that change notify Application 936 can store information in memory 910 such as in event buffers, hash tables and filter buffers 924 or the like.

Human interface components (not pictured), may be remotely associated with node 900, which can enable remote input to and/or output from node 900. For example, information to a display or from a keyboard can be routed through the input/output interface 940 to appropriate peripheral human interface components that are remotely located. Examples of peripheral human interface components include, but are not limited to, an audio interface, a display, keypad, pointing device, touch interface, and the like.

Data storage 920 may reside within memory 910 as well, storing file storage 922 data such as metadata or LIN data. It can be appreciated that LIN data and/or metadata can relate to rile storage within processor readable stationary storage 950 and/or processor readable removable storage 960. For example, LIN data may be cached in memory 910 for faster or more efficient frequent access versus being stored within processor readable stationary storage 950. In addition, Data storage 920 can also store event buffers, hash tables and filter buffers 924 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   receiving a set of change notify requests received from a set of clients, wherein change notify requests are associated with at least one target file or target directory;
   generating a set of user space filter buffers, wherein user space filter buffers are associated with change notify requests;
   generating a hash table to store event entries wherein each event entry includes at least an event logical inode number ("LIN"), a parent LIN, an event type, and a generation number;
   maintaining a hash table generation number associated with the hash table;
   adding event entries to subsets of user space filters based on the event LIN associated with the event entry; and
   notifying clients associated with the subset of user space filter buffers.

2. The method of claim 1, further comprising:
   receiving a new set of event entries from a kernel space buffer;
   in response to receiving the new set of event entries:
      incrementing the hash table generation number associated with the hash table; and
      assigning the incremented hash table generation number as the generation number for each event entry in the new set of event entries; and
   determining if the event LIN of an event entry in the new set of event entries matches the event LIN of an event entry in the hash table.

3. The method of claim 2, further comprising:
   in response to the event LIN of the event entry in the new set of event entries not matching the event LIN of an event entry in the hash table:
   adding the event entry to the hash table; and
   adding the event entry to the subset of user space filters associated with the event LIN.

4. The method of claim 2, further comprising:
   in response to the event LIN of the event entry in the new set of event entries matching the event LIN of an event entry in the hash table:
      determining a value difference between the generation number of the event entry in the new set of event entries and the generation number of the event entry in the hash table;
      in response to the value difference being less than a frequency threshold, deduplicating the event entry.

5. The method of claim 4, further comprising:
   in response to the value difference being more than the frequency threshold:
      replacing the generation number of the event entry in the hash table with the generation number of the event entry in the new set of event entries.

6. The method of claim 1, further comprising:
   determining a value difference between the generation number of event entries of the hash table and the generation number associated with the hash table for each event entry in the hash table;
   in response to the value difference being greater than a frequency threshold for an event entry in the hash table, deleting the event entry from the hash table.

7. A non-transitory computer readable medium with program instructions stored thereon to perform the following acts:
   receiving a set of change notify requests received from a set of clients, wherein change notify requests are associated with at least one target file or target directory;
   generating a set of user space filter buffers, wherein user space filter buffers are associated with change notify requests;
   generating a hash table to store event entries wherein each event entry includes at least an event logical inode number ("LIN"), a parent LIN, an event type, and a generation number;
   maintaining a hash table generation number associated with the hash table;
   adding event entries to subsets of user space filters based on the event LIN associated with the event entry; and
   notifying clients associated with the subset of user space filter buffers.

8. The non-transitory computer readable medium of claim 7, with program instructions stored thereon to further perform the following acts:

receiving a new set of event entries from a kernel space buffer;

in response to receiving the new set of event entries:
    incrementing the hash table generation number associated with the hash table; and
    assigning the incremented hash table generation number as the generation number for each event entry in the new set of event entries; and determining if the event LIN of an event entry in the new set of event entries matches the event LIN of an event entry in the hash table.

9. The non-transitory computer readable medium of claim 8, with program instructions stored thereon to further perform the following acts:

in response to the event LIN of the event entry in the new set of event entries not matching the event LIN of an event entry in the hash table:
adding the event entry to the hash table; and
adding the event entry to the subset of user space filters associated with the event LIN.

10. The non-transitory computer readable medium of claim 8, with program instructions stored thereon to further perform the following acts:

in response to the event LIN of the event entry in the new set of event entries matching the event LIN of an event entry in the hash table:
    determining a value difference between the generation number of the event entry in the new set of event entries and the generation number of the event entry in the hash table;
    in response to the value difference being less than a frequency threshold, deduplicating the event entry.

11. The non-transitory computer readable medium of claim 10, with program instructions stored thereon to further perform the following acts:

in response to the value difference being more than the frequency threshold:
    replacing the generation number of the event entry in the hash table with the generation number of the event entry in the new set of event entries.

12. The non-transitory computer readable medium of claim 7, with program instructions stored thereon to further perform the following acts:

determining a value difference between the generation number of event entries of the hash table and the generation number associated with the hash table for each event entry in the hash table;
in response to the value difference being greater than a frequency threshold for an event entry in the hash table, deleting the event entry from the hash table.

13. A system comprising a cluster of nodes operating as a distributed file system wherein nodes among the cluster of nodes contain at least one storage device and at least one hardware processor configured to:

receive a set of change notify requests received from a set of clients, wherein change notify requests are associated with at least one target file or target directory;

generate a set of user space filter buffers, wherein user space filter buffers are associated with change notify requests;

generate a hash table to store event entries wherein each event entry includes at least an event logical inode number ("LIN"), a parent LIN, an event type, and a generation number;

maintain a hash table generation number associated with the hash table;

add event entries to subsets of user space filters based on the event LIN associated with the event entry; and notify clients associated with the subset of user space filter buffers.

14. The system of claim 13, further configured to:

receive a new set of event entries from a kernel space buffer;

in response to receiving the new set of event entries:
    increment the hash table generation number associated with the hash table; and
    assign the incremented hash table generation number as the generation number for each event entry in the new set of event entries; and determine if the event LIN of an event entry in the new set of event entries matches the event LIN of an event entry in the hash table.

15. The system of claim 14, further configured to:

in response to the event LIN of the event entry in the new set of event entries not matching the event LIN of an event entry in the hash table:
add the event entry to the hash table; and
add the event entry to the subset of user space filters associated with the event LIN.

16. The system of claim 14, further configured to:

in response to the event LIN of the event entry in the new set of event entries matching the event LIN of an event entry in the hash table:
    determine a value difference between the generation number of the event entry in the new set of event entries and the generation number of the event entry in the hash table;
    in response to the value difference being less than a frequency threshold, deduplicate the event entry.

17. The system of claim 16, further configured to:

in response to the value difference being more than the frequency threshold:
    replace the generation number of the event entry in the hash table with the generation number of the event entry in the new set of event entries.

18. The system of claim 13, further configured to:

determine a value difference between the generation number of event entries of the hash table and the generation number associated with the hash table for each event entry in the hash table;

in response to the value difference being greater than a frequency threshold for an event entry in the hash table, delete the event entry from the hash table.

* * * * *